(12) United States Patent
Vandeputte et al.

(10) Patent No.: US 9,250,691 B2
(45) Date of Patent: Feb. 2, 2016

(54) METHOD, APPARATUS AND SYSTEM FOR POWER MANAGEMENT THROUGH BACKLIGHT AND OTHER PERIPHERAL CONTROLS

(75) Inventors: Casey Vandeputte, Waterloo (CA); Teodoro Salluzzi, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 125 days.

(21) Appl. No.: 12/964,335

(22) Filed: Dec. 9, 2010

(65) Prior Publication Data

US 2012/0151236 A1 Jun. 14, 2012

(51) Int. Cl.
| H04M 1/00 | (2006.01) |
| G06F 1/32 | (2006.01) |
| H04B 1/16 | (2006.01) |
| G06F 1/00 | (2006.01) |
| G09G 3/36 | (2006.01) |

(52) U.S. Cl.
CPC ............ *G06F 1/3265* (2013.01); *G06F 1/3209* (2013.01); *G06F 1/3287* (2013.01); *Y02B 60/1242* (2013.01); *Y02B 60/1282* (2013.01)

(58) Field of Classification Search
CPC .................. H04W 52/0245; H04M 1/72519
USPC .................. 455/566, 343.5; 713/324; 345/102
See application file for complete search history.

(56) References Cited

U.S. PATENT DOCUMENTS

| 2002/0036637 | A1* | 3/2002 | Ogawa ........................... 345/212 |
| 2002/0093923 | A1* | 7/2002 | Bouet ............................ 370/328 |
| 2003/0159075 | A1  | 8/2003 | Miyazaki |
| 2004/0043800 | A1* | 3/2004 | Hosoi ......................... 455/575.1 |
| 2008/0065918 | A1  | 3/2008 | Wong |
| 2011/0260958 | A1* | 10/2011 | Shabel et al. ................. 345/102 |

FOREIGN PATENT DOCUMENTS

JP      2001036637 A    2/2001

OTHER PUBLICATIONS

EESR; EP App. No. 10194419.7; dated Jun. 8, 2011.
Sharp Electronics: "YO-500 YO-530 Operation Manual", Jan. 15, 2003, pp. 1-146, XP002635507, retrieved from http://www.sharpusa.com/downloads/archives/product_manuals/org_man_YO500-530.pdf, retrieved on May 4, 2011.
http://www.datamystic.com/filewatcher.html; retrieved Dec. 9, 2010.
Examination Report mailed Jul. 24, 2013, in corresponding European patent application No. 10194419.7.

* cited by examiner

*Primary Examiner* — Muthuswamy Manoharan
(74) *Attorney, Agent, or Firm* — Fish & Richardson P.C.

(57) ABSTRACT

A method, apparatus and system for power management in a mobile computing device is provided. In one aspect, the mobile computing device comprises a display with a backlight that is power by a power supply under the control of a processor. The mobile computing device is also configured to execute a web browser or other application that access a network resource. Activation of the backlight is controlled in coordination with the network resource in order to manage drain of power from the power supply.

13 Claims, 14 Drawing Sheets

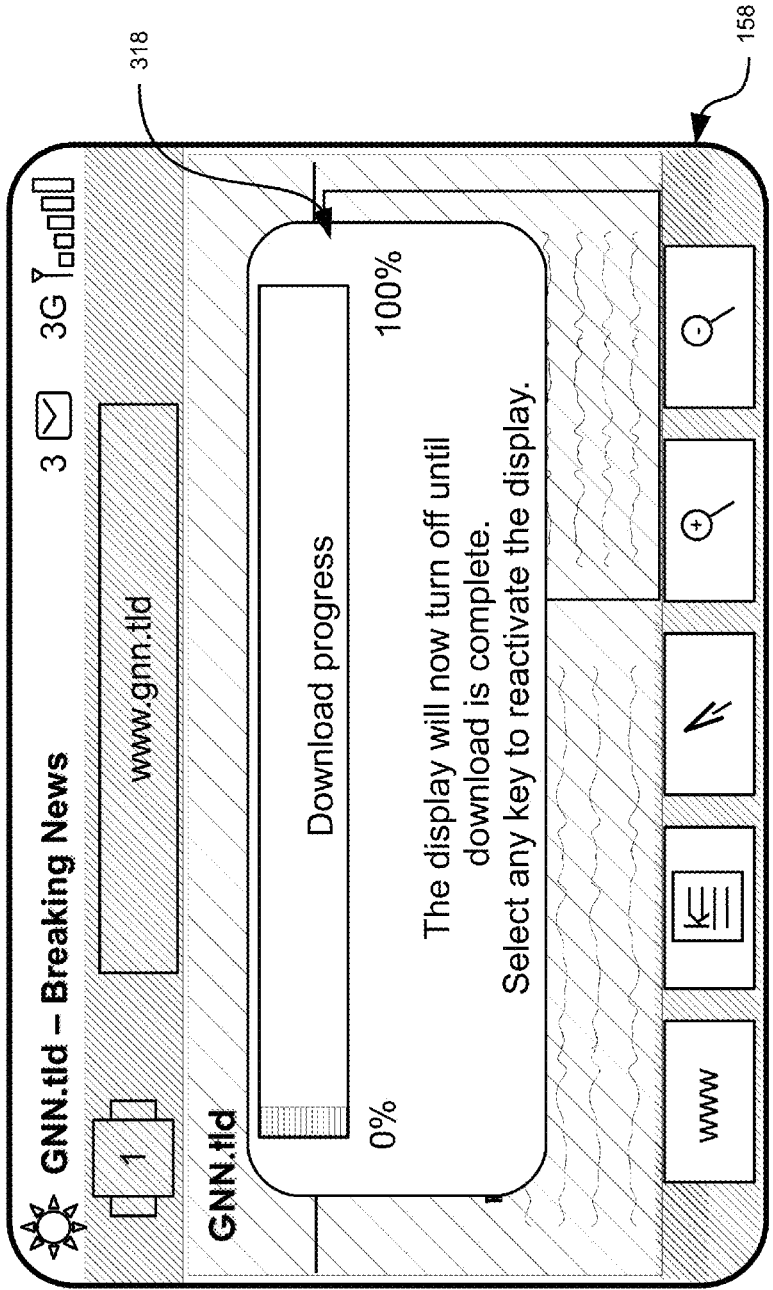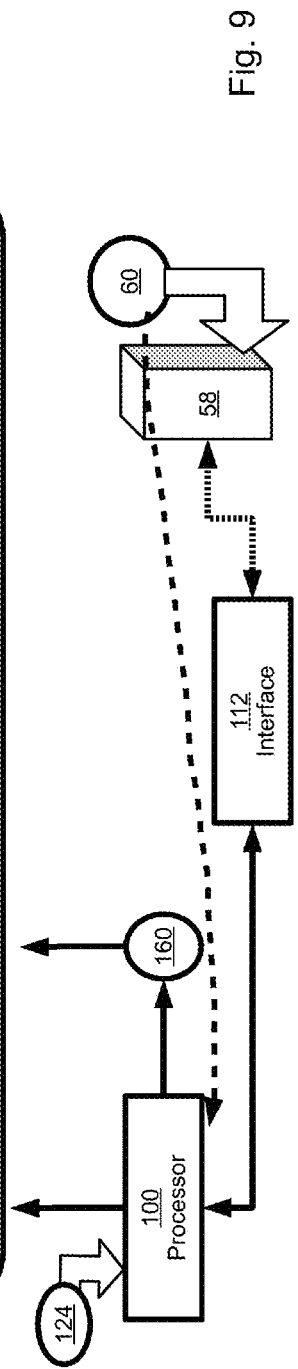
Fig. 9

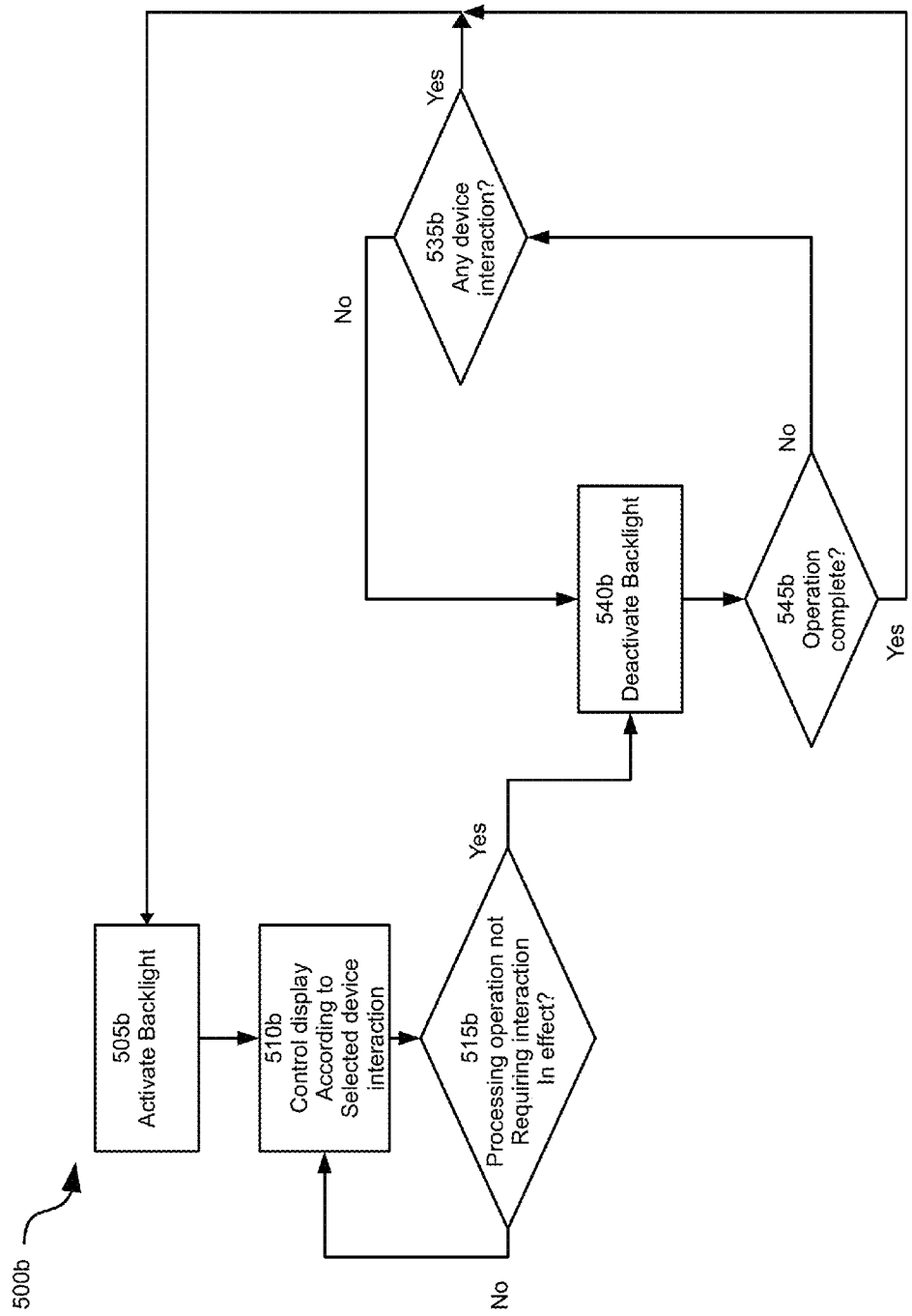

1

METHOD, APPARATUS AND SYSTEM FOR POWER MANAGEMENT THROUGH BACKLIGHT AND OTHER PERIPHERAL CONTROLS

FIELD

The present specification relates generally to computing devices and more particular relates to a method, apparatus and system for power management through backlight and other peripheral controls.

BACKGROUND

The evolution of computers is currently quite active in the mobile device environment. However, as the processing and wireless communications demands on such device increases, so too do the demands on management of battery life.

BRIEF DESCRIPTION OF THE DRAWINGS

FIG. 9 shows another representation of the device of FIG. 6.

FIG. 14 shows a variation on the flow chart of FIG. 5.

DETAILED DESCRIPTION

Figure 1:
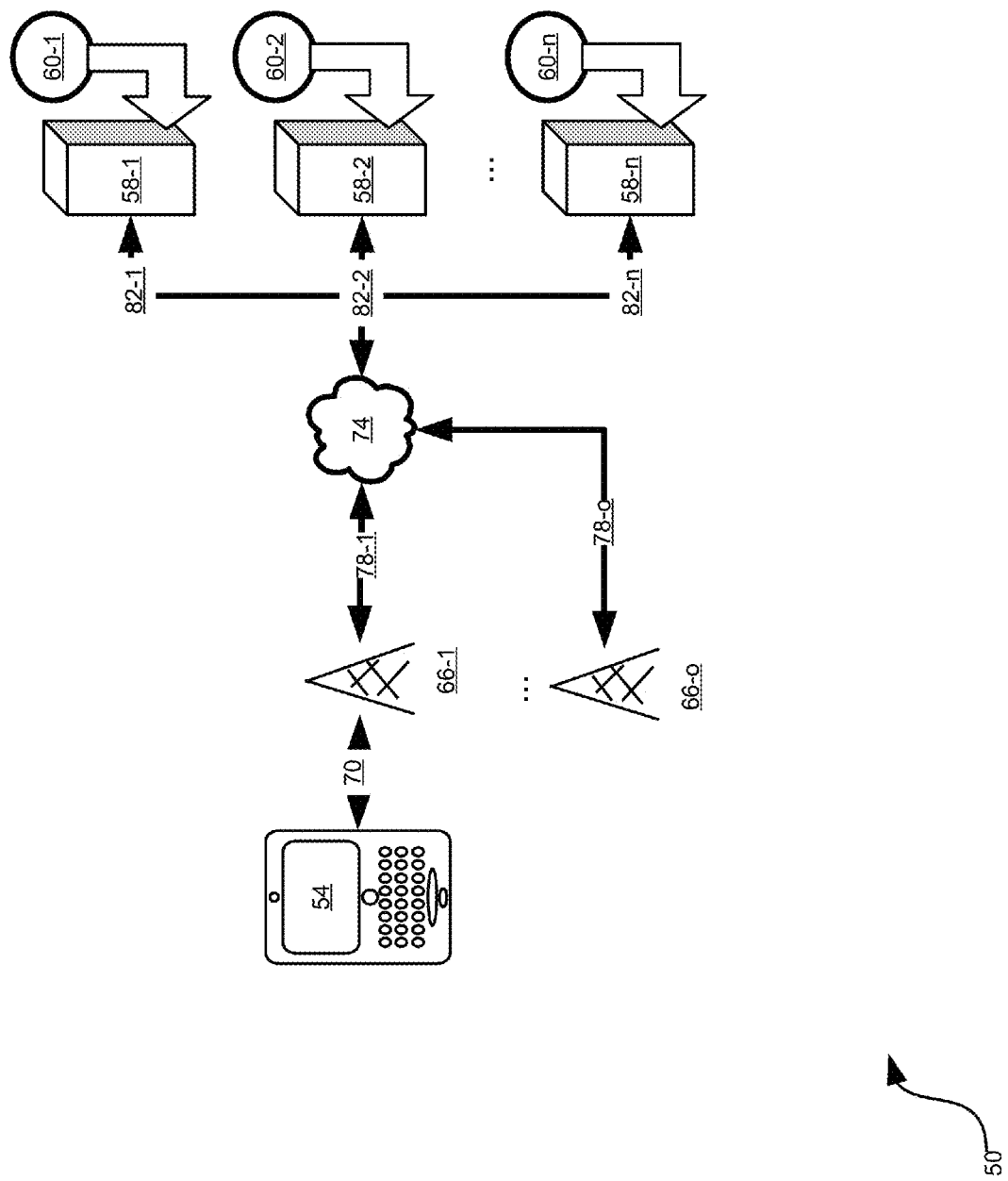
FIG. 1 is a schematic representation of a system for power management in a mobile computing device.

A method, apparatus and system for power management in a mobile computing device is provided. In one aspect, the mobile computing device comprises a display with a backlight that is powered by a power supply under the control of a processor. The mobile computing device is also configured to execute a web browser or other application that accesses a network resource. Activation of the backlight is controlled in coordination with the network resource in order to manage drain of power from the power supply.

Another aspect of this specification provides, more generally, a method for power management in a mobile computing device comprising: activating a display in the mobile computing device such that a first amount of power is drawn from a power supply of the mobile computing device; deactivating the display such that a second amount of power is drawn from the power supply, the second amount being less than the first amount, when a processing operation is occurring which does not require generation of output or reception of input and, activating an output apparatus after at least a portion of the processing operation is complete.

The processing operation may comprise at least one of a file transfer, an application installation, playing an audio file, implementing a device boot-up sequence, and installation of a device theme.

The processing operation may be a data transfer occurring between the mobile computing device and a remote computing apparatus connected to the mobile computing device. The method may further comprise reactivating the display during the data transfer upon detecting a device interaction other than a completion of the at least a portion of the data transfer. The method may further comprise deactivating the display if the device interaction ceases and the at least a portion of the data transfer has not completed. The remote computing apparatus may be a server connected to the computing device via a network and the data transfer may be a download from the server. The remote computing apparatus may be another computing device connected via a peer-to-peer connection to the computing device. The remote computing apparatus may be storage device locally connectable to the computing device. The at least a portion of the processing operation may be an the receipt of an entirety of the data transfer.

The activating of the output apparatus may comprise reactivating the display.

The deactivating may comprise dimming the display such that the second amount is reduced but still greater than zero.

The deactivating may comprise turning off the display such that the second amount is zero.

The activating of the output apparatus may comprise activating at least one of an indicator light, generation of an audio signal or generation of haptic output from the device.

The device interaction may comprise any one or more of: receipt of input via an input apparatus connected to the mobile computing device; when an automatic refresh of web page occurs; when any type of data other than the data transfer is received by the device; an alarm; a calendar notification; when a secure web page is generating a warning of automatic connection termination due to inactivity.

The reactivating of the display may be configured to occur if the data transfer fails before the at least a portion of the data transfer is complete.

The display may comprise a backlight and the activating may comprise activating the backlight and the deactivating may comprise deactivating the backlight.

According to another aspect of this specification, a mobile computing device is provided in accordance with any of the foregoing methods.

According to another aspect of this specification, a remote computing apparatus is provided in accordance with any of the foregoing methods.

According to another aspect of this specification, another computing device is provided in accordance with any of the foregoing methods.

According to another aspect of this specification, a computer readable medium storing a plurality of programming instructions that are executable on a processor of a mobile computing device is provided in accordance with any of the foregoing methods.

Referring now to FIG. 1, a system for power management in a mobile computing device is indicated generally at 50. In a present embodiment system 50 comprises at least one computing device in the form of a mobile computing device 54 and at least one server 58-1, 58-2 . . . 58-*n*. (Generically, server 58, and collectively, servers 58. This nomenclature is used elsewhere herein).

A wireless link 70 connects mobile computing device 54 with one of a plurality of wireless base stations 66. In FIG. 1, mobile computing device 54 is shown as connecting to a first base station 66-1 via wireless link 70, but mobile computing device 54 can also connect to other base stations 66 in system 50. Backhaul links 78 connect each base station 66 to a network 74. Additional backhaul links 82 connect network 74 to each server 58.

Mobile computing device 54 can be any type of electronic device that can be used in a self-contained manner and to interact with content available on network 74. Interaction includes displaying of information on mobile computing device 54 as well as to receive input at mobile computing device 54 that can in turn be sent back over network 74. Mobile computing device 54 will be explained in greater detail below.

It should now be understood that the nature of network 74 and links 70, 78 and 82 associated therewith is not particularly limited and are, in general, based on any combination of architectures that will support interactions between mobile computing device 54 and servers 58. In a present embodiment network 74 includes the Internet as well as appropriate gateways and backhauls to links 78 and 82. For example, backhaul links 78 and backhaul links 82 can be based on a T1, T3, O3 or any other suitable wired or wireless connections. Accordingly, the links 78 and 82 between network 74 and the interconnected components are complementary to functional requirements of those components.

Link 70 may be based on, by way of non-limiting examples, a core mobile network infrastructure, such as, by way of non-limiting examples, one or more of Global System for Mobile communications ("GSM"); Code Division Multiple Access ("CDMA"); CDMA 2000; 3G; or Evolution-Data Optimized or Evolution-Data ("EVDO"); or successors thereto or hybrids or combinations thereof; or on a wireless local area network ("WLAN") infrastructures such as, by way of non-limiting examples, the Institute for Electrical and Electronic Engineers ("IEEE") 802.11 Standard (and its variants) or Bluetooth™ or the like or hybrids or combinations thereof. Note that in an example variation of system 50 it is contemplated that link 70 may be a wired connection.

Servers 58 can be based on any well-known server environment including a module that houses one or more central processing units, volatile memory (e.g. random access memory), persistent memory (e.g. hard disk devices) and network interfaces to allow servers 58 to communicate over network 74. For example, each server 58 can be a ProLiant® Server from Hewlett-Packard Company, 3000 Hanover Street Palo Alto, Calif. 94304-1185 USA having a plurality of central processing units and having several gigabytes of random access memory. However, it is to be emphasized that this particular server is merely a non-limiting example, and a vast array of other types of computing environments for each server 58 is contemplated. Furthermore, it is contemplated that each server 58 may be implemented as a plurality of interconnected servers, in a so-called server farm, which are mirrored or otherwise configured for load balancing or failover or high availability or any or all of those.

As will be discussed further below, each server 58 maintains a different server-side networking application 60. Networking applications 60 can be any application whereby a corresponding client-side application executes on mobile computing device 54 which accesses data or any other server functions on a given server 58. Networking applications can be, by way of non-limiting examples, web pages, personal information management applications, social networking applications, or messaging applications. Non-limiting examples of personal information management applications include calendaring and contact management applications. Non-limiting examples of social networking application 60 include Facebook™, Twitter™, LinkedIn™, and MySpace™. Networking applications 60 can also comprise message applications such as email, BlackBerry Messenger, AOL instant messenger (AIM), Yahoo Messenger (YM), Google Talk (Gtalk), Lotus Connections, Windows Live Messenger. There are many others.

Figure 2:
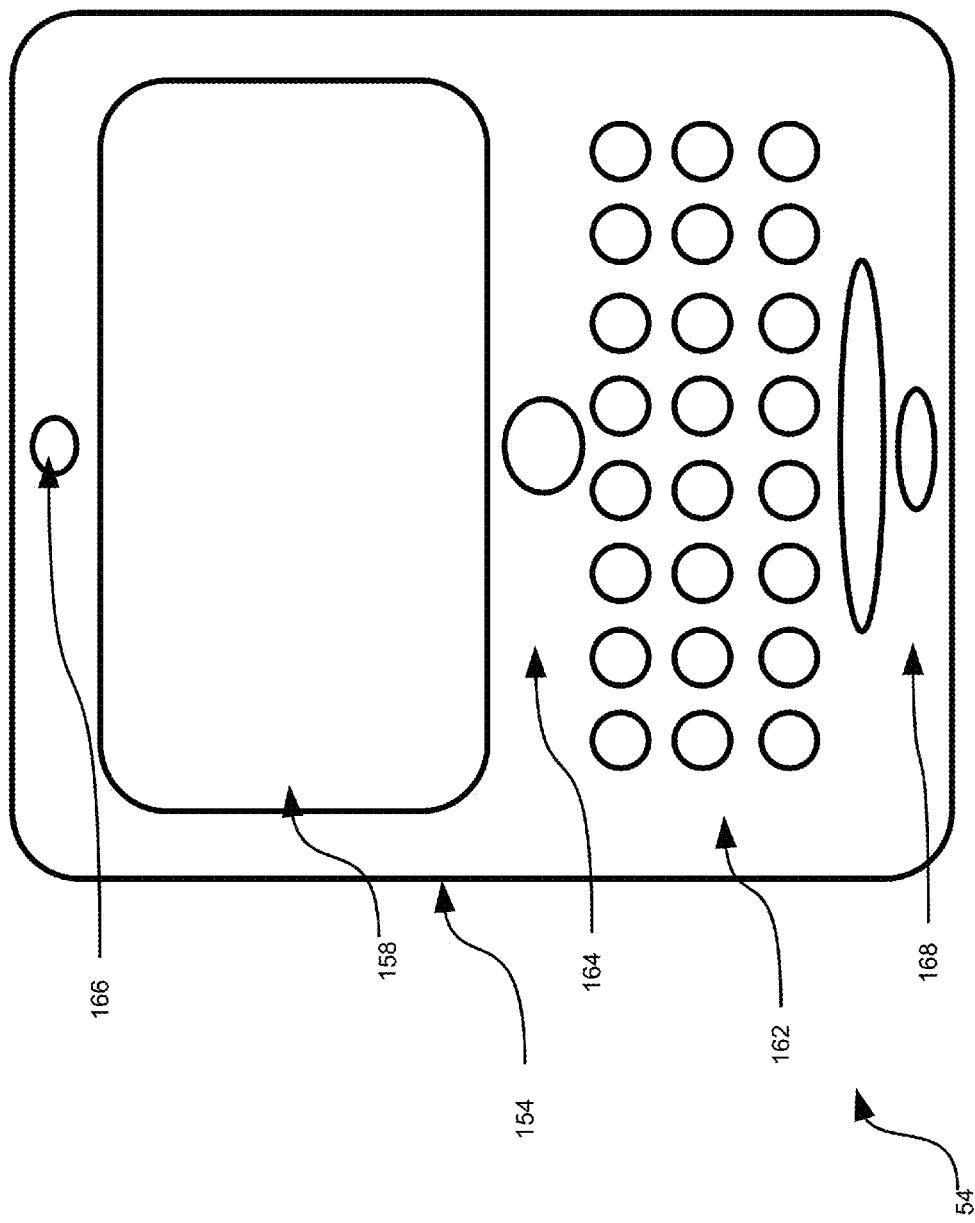
FIG. 2 is a representation of a front view of the mobile computing device of the system of FIG. 1.
Figure 3:
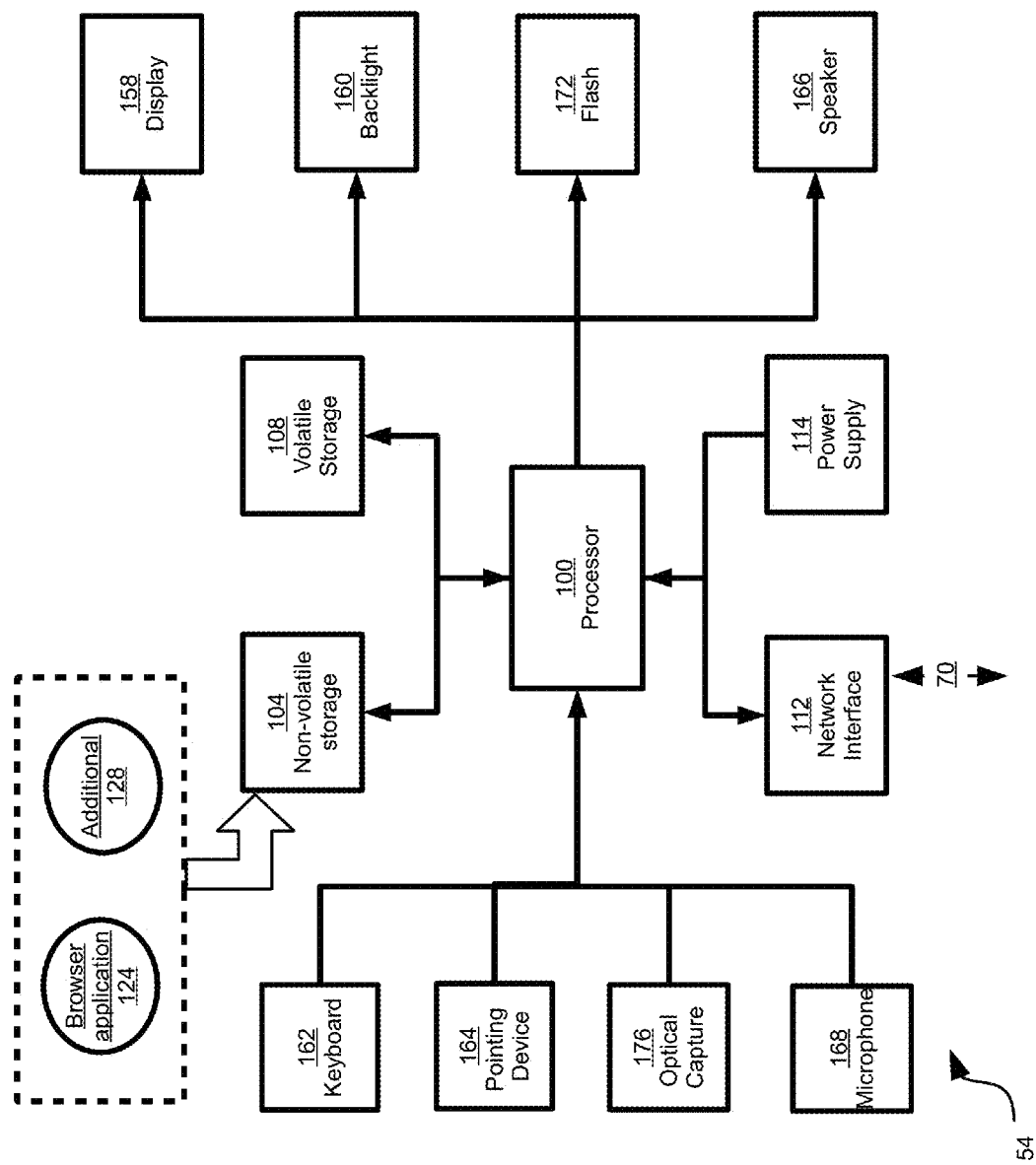
FIG. 3 is a block diagram of the device shown in FIG. 1.

FIG. 2 and FIG. 3 show different views and representations of a non-limiting example of a mobile computing device 54 which can execute one or more applications as discussed in greater detail below. It is to be understood that mobile computing device 54 is an example, and it will be apparent to those skilled in the art that a variety of different portable electronic device structures are contemplated. Indeed variations on mobile computing device 54 can include, without limitation, a cellular telephone, a portable email paging device, a network enabled digital camera, a portable music player, a portable video player, a portable video game player, a tablet computer.

Referring to FIG. 2, in a present, non-limiting example, device 54 comprises a chassis 154 that supports a display 158. Display 158 can comprise one or more light emitters such as an array of light emitting diodes (LED), liquid crystals, plasma cells, or organic light emitting diodes (OLED). Other types of light emitters are contemplated. Chassis 154 also support a keyboard 162. It is to be understood that this specification is not limited to any particular structure, spacing, pitch or shape of keyboard 162, and the depiction in FIG. 2 is an example. For example, full or reduced "QWERTY" keyboards are contemplated. Other types of keyboards are contemplated. (In variations, device 54 may also be a touch-screen device with no physical keyboard, a non-limiting example of which is discussed below.) Device 54 also comprises a pointing device 164 which can be implemented as a touch-pad, joystick, trackball, track-wheel, or as a touch sensitive membrane on display 158. Device 54 may also comprise a speaker 166 for generating audio output, and a microphone 168 for receiving audio input.

FIG. 3 shows a schematic block diagram of the electronic components of device 54. It should be emphasized that the structure in FIG. 3 is an example. Device 54 includes a plurality of input apparatus which in a present embodiment includes keyboard 162, pointing device 164, and microphone 168 and an optical capture unit 176. Fewer, additional, or alternative input apparatuses are contemplated. Input from keyboard 162, pointing device 164 and microphone 168 and optical capture unit 176 is received at a processor 100. (Note a plurality of processors may be used in device 54). Processor 100 can be configured to execute different programming instructions that can be responsive to the input received via input apparatuses. To fulfill its programming functions, processor 100 is also configured to communicate with a non-volatile storage unit 104 (e.g. Erase Electronic Programmable Read Only Memory ("EEPROM"), Flash Memory) and a volatile storage unit 108 (e.g. random access memory ("RAM")). Programming instructions that implement the functional teachings of device 54 as described herein are typically maintained, persistently, in non-volatile storage unit 104 and used by processor 100 which makes appropriate utilization of volatile storage 108 during the execution of such programming instructions.

Processor 100 in turn is also configured to control display 158, a backlight 160 for illuminating display 158, speaker 166 and flash 172, also in accordance with different programming instructions and optionally responsive to different input receive from the input apparatuses. Fewer, additional, or alternative output apparatuses are contemplated. Note that backlight 160 may also be configured to illuminate keyboard 162 or other portions of device 50 other than, or in addition to, display 158. The teachings in relation to deactivating backlight 160 and reactivating backlight 160 are likewise applicable to such other uses of backlight 160.

Processor 100 also connects to a network interface 112, which can be implemented in a present embodiment as one or more radios configured to communicate over link 70. Network interface 112 can thus be generalized as a further input/output apparatus that can be utilized by processor 100 to fulfill various programming instructions. It will be understood that interface 112 is configured to correspond with the network architecture that defines link 70. It is also contemplated each network interface 112 can include multiple radios to accommodate the different protocols that may be used to implement different types of links where the network architecture for each link 70 differs between base stations 66.

A power supply 114, typically in the form of a rechargeable battery, is also provided. While FIG. 3 shows power supply 114 connected to processor 100, it will be understood that processor 100 generally provides electrical power to all power-consuming components in device 54.

In a present embodiment, device 54 is also configured to maintain, within non-volatile storage 104, a web browser application 124. One or more of a plurality of additional client networking applications 128 may also be provided. Non-limiting examples of additional applications 128 can comprise, without limitation, one or more of social networking client applications, e.g., Twitter, Facebook, MySpace, LinkedIn; other applications associated with online communities e.g., Flickr, Gtalk, etc; document tools such as Google Docs. Any one or more of browser application 124 and client applications 128 can be pre-stored in non-volatile storage 104 upon manufacture of device 54, or downloaded via network interface 112 and saved on non-volatile storage 104 at any time subsequent to manufacture of device 54. Each application 124, 128 is configured to interact with a corresponding network application 60 as needed.

Processor 100 is configured to execute each application 124, 128, making use of input from apparatuses and controlling display 158 to generate output based on that input and according to the programming instructions of each application 124, 128. Backlight 160 is selectively activated in accordance with the teachings herein in order to manage power drain from power supply 114. In general, each application 124, 128 can be based on any existing or future application 124, 128 that can be executed entirely on a device such as device 54.

Processor 100 is also configured to execute web browser application 124 to permit access to networking applications 60 via network 74, as will be explained further below.

Figure 4:
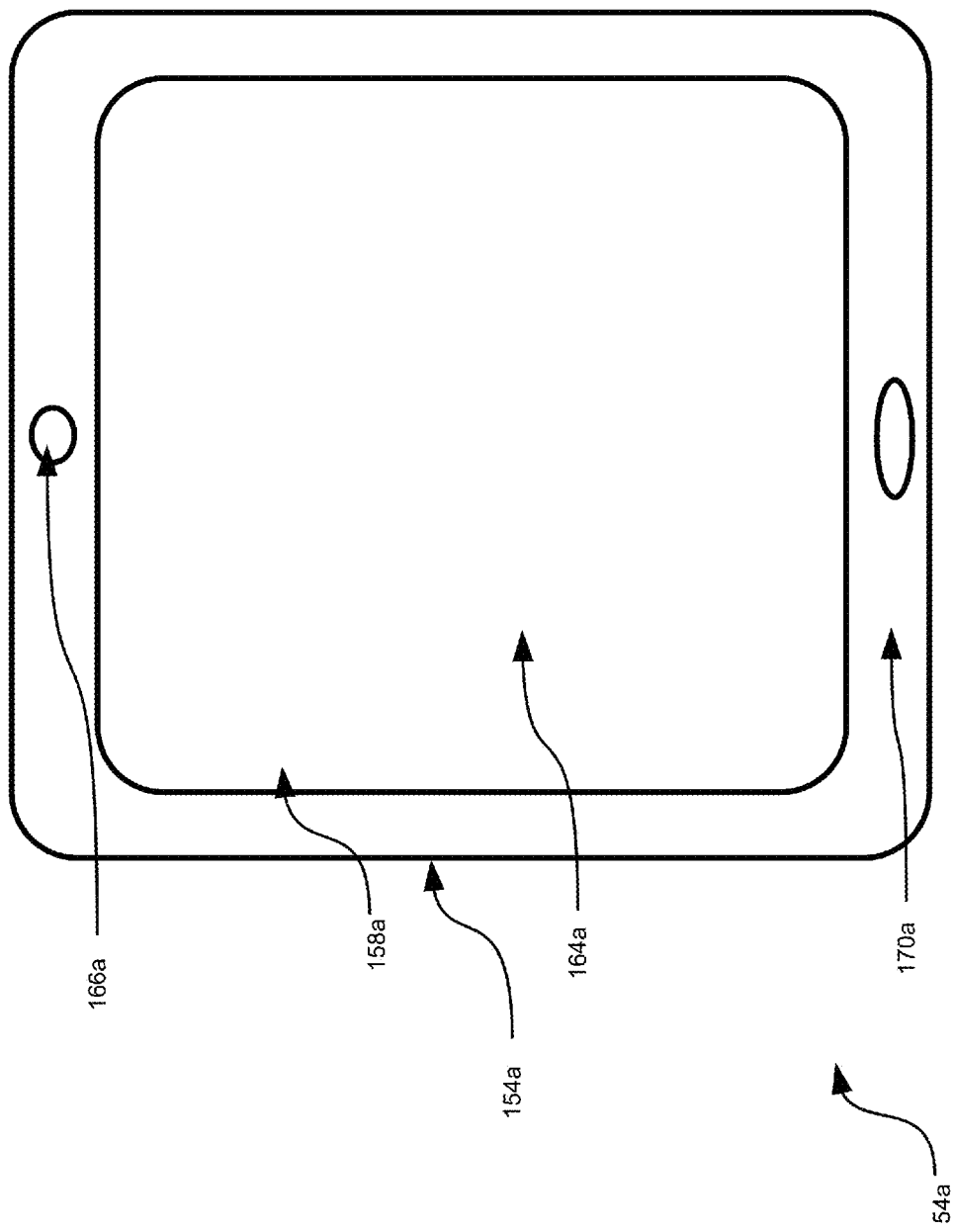
FIG. 4 is a representation of a variation of the mobile computing device of FIG. 1.

Referring briefly to FIG. 4, a variation on device 54 is indicated generally as device 54a. Device 54a comprises many of the same components as device 54, and therefore like components bear like references except followed by the suffix "a". Of note is that device 54a excludes a physical keyboard 162 and pointing device 164. Instead, device 54a comprises a touch screen 164a which provides the combined functionality of keyboard 162 and pointing device 164. Further variations on device 54 will now occur to those skilled in the art, but for convenience, further discussion of the present specification will focus on device 54 as described above.

Figure 5:
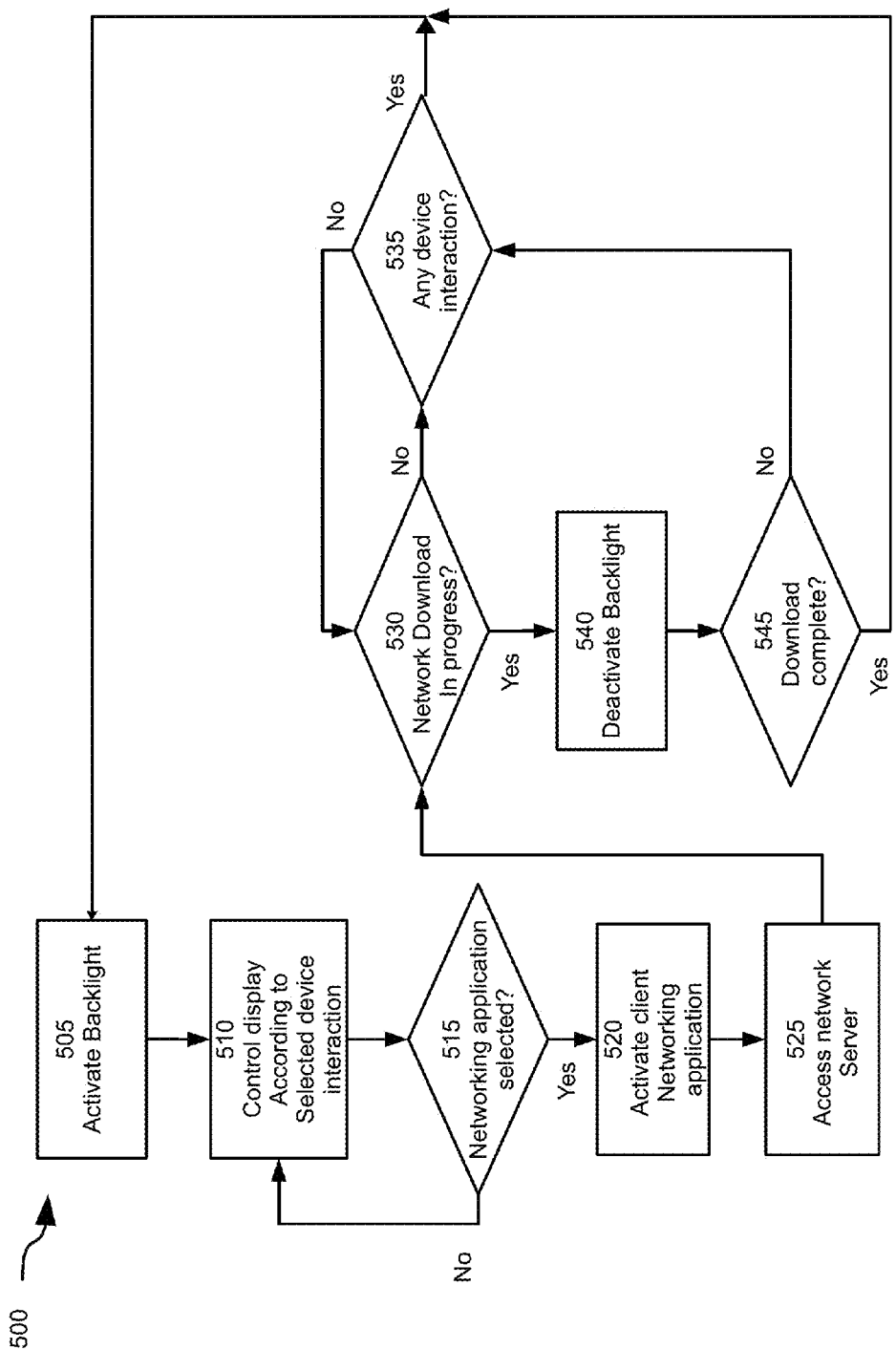
FIG. 5 is a flow chart representing a method for power management in a mobile computing device.

Referring now to FIG. 5, a flow-chart depicting a method for power management in a mobile computing device is indicated generally at 500. Method 500 can be implemented using system 50, and for purposes of explaining method 500 it will be assumed that method 500 is performed using system 50. However, it is to be understood that variations are contemplated to both method 500 and system 50 and such variations are within the scope of this specification.

Block 505 comprises activating a device backlight, and block 510 comprises controlling the device display according to a selected device interaction. There are virtually limitless ways that block 505 and block 510 can be implemented, and in general block 505 and block 510 reflect an activation of display 158 and backlight 160 under the control of processor 100 to generate images that correspond to an application that is currently being executed by processor 100. For example, a main menu application (not shown in FIG. 3) may be active whereby various options for executing browser application 124 or one of the additional applications 128 are offered, and whereby input received by keyboard 162 or pointing device 164 may be received at processor 100 to invoke an application corresponding to the selected option.

Block 515 comprises determining if a networking application is selected. A "no" determination from block 515 leads back to block 510, whereas a "yes" determination leads to block 520. The means by which block 515 are effected are not particularly limited. In general, if an application that makes use of a network application 60 via network 74 is selected, then a "yes" determination is reached, whereas otherwise a "no" determination is reached at block 515. In the specific but non-limiting example of device 54, if processor 100 is instructed to execute application 124 or an additional application 128 then a "yes" determination is made at block 515, and otherwise a "no" determination is reached.

Assuming a "yes" determination is made at block 515, then block 520 comprises activating the application selected at block 520. The term "activating" is not to be construed in a limiting sense and generally refers to the execution of such an application on processor 100.

Figure 6:
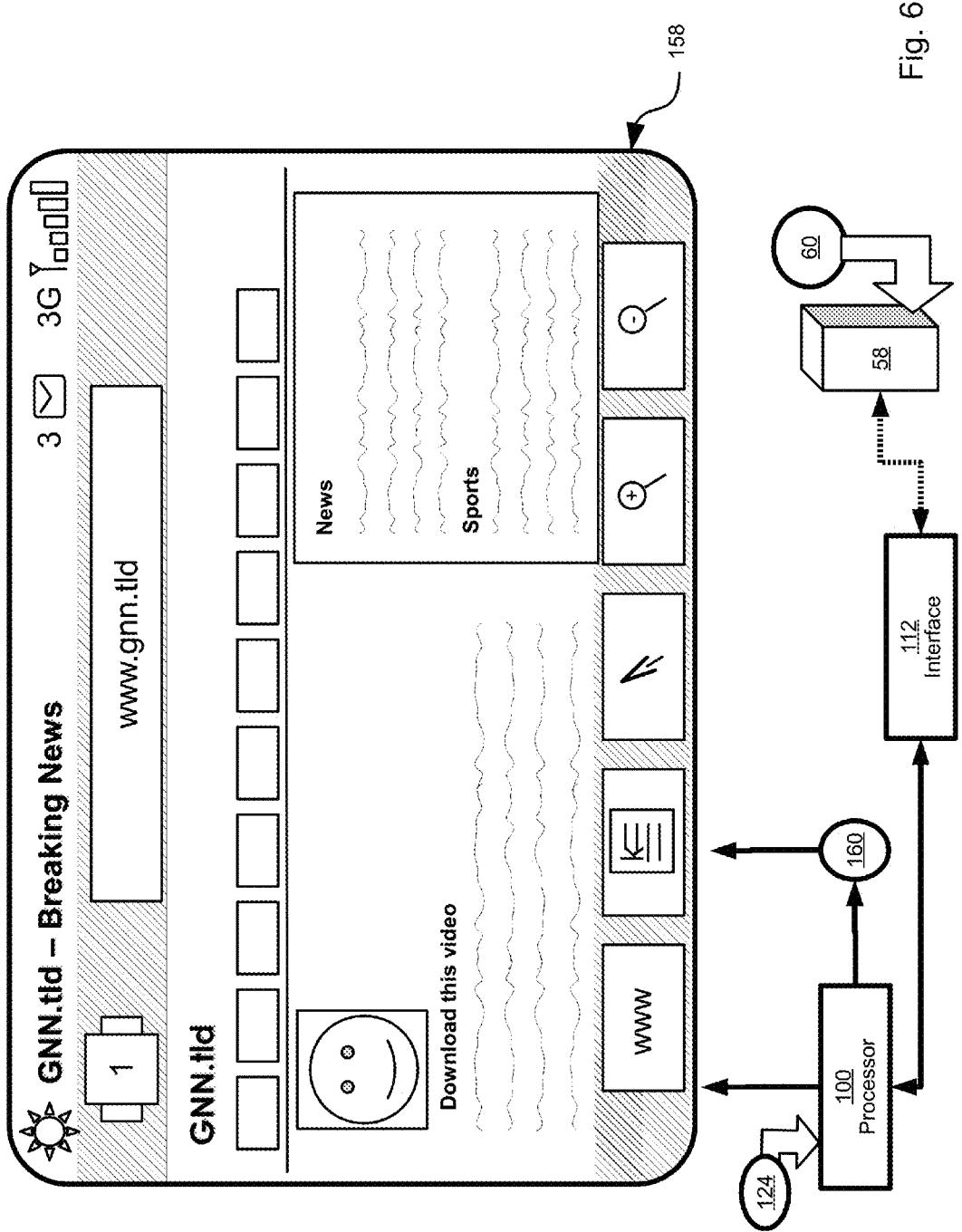
FIG. 6 shows certain elements of the device of FIG. 3 when executing the web browser application.
Figure 7:
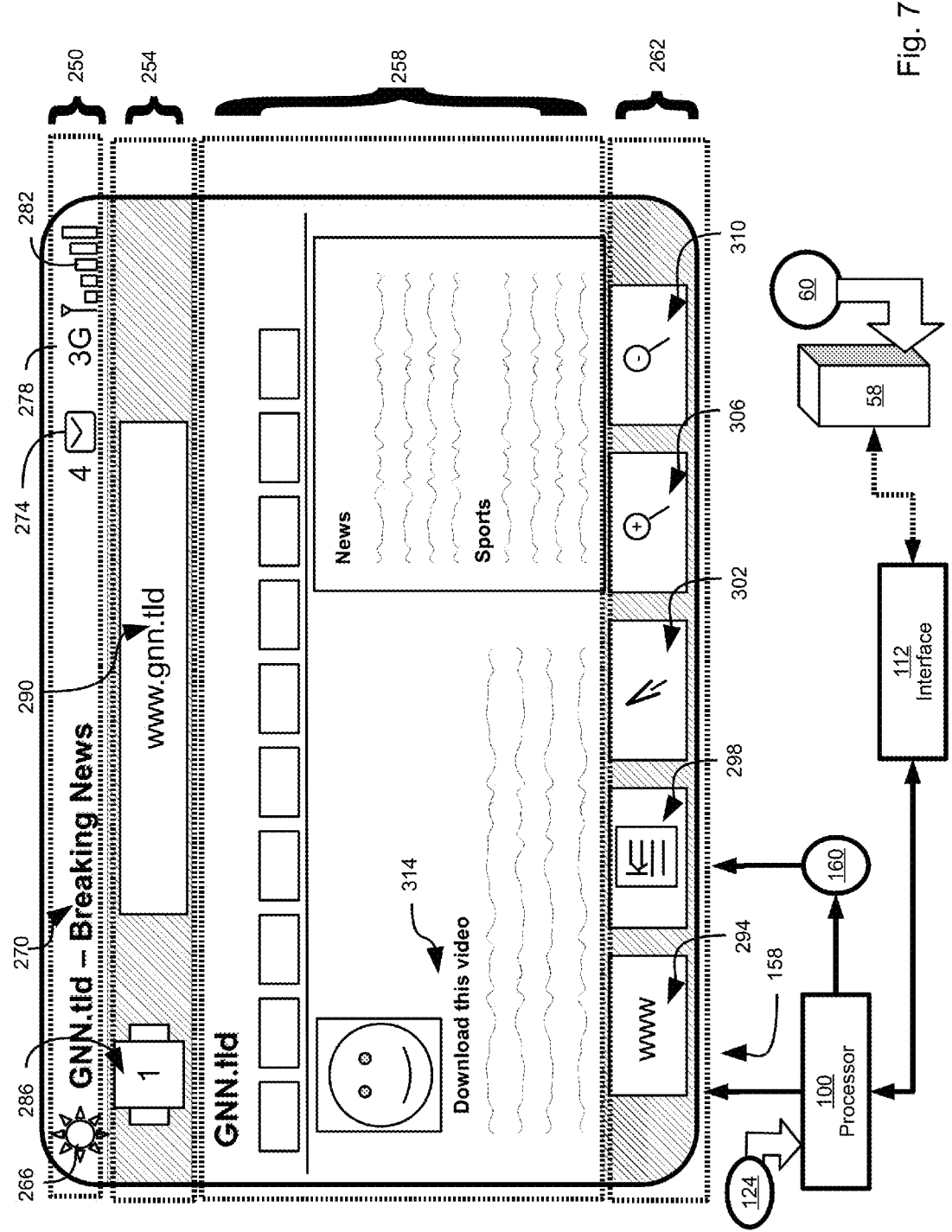
FIG. 7 shows the same representation of the device as FIG. 6, except that further reference characters are provided to explain certain elements shown on the display of the device as generated by the device's processor.

FIG. 6 shows exemplary execution by processor 100 of browser application 124 where, as a result of such execution, processor 100 controls display 158 to generate a plurality of graphic elements. FIG. 7 shows the same view as FIG. 6, but also includes references identifying the various graphic elements, which comprise, in a non-limiting example, a status bar 250, an address bar 254, a browser pane 258, and a tool bar 262.

Status bar 250 comprises a favicon 266 (which is a short form for "favorites icon") and a page title 270 which identifies a title for the contents shown in browser pane 258. Favicon 266 is a graphic that can represent the page title 270. Note that the appearance of favicon 266 and page title 270 varies according to the contents of browser pane 258.

Status bar 250 also comprises a message indicator 274 that indicates a number of waiting or unopened messages that are associated with a message application (e.g. one of the additional applications 128) that is also executable by processor 100. In the present example, four messages are shown as waiting or unopened. Status bar 250 also comprises a network type indicator 278, indicating the protocol that is currently active over network interface 112. In this example, a 3G network is active. Status bar 250 also comprises a network strength indicator 282, indicating the signal strength of the currently active network 282 identified by indicator 278. Note that the appearances of message indicator 274, network type indicator 278 and network strength indicator 282 are independent of the contents of browser pane 258.

Those skilled in the art will now appreciate that status bar 250 can comprise fewer or additional elements indicating the overall status of device 50, including, by way of non-limiting example, time, date and battery strength.

Address bar 254 comprises an active-page indicator 286 and an address field 290. Active-page indicator 286 reflects the functionality of browser application 124 whereby browser application 124 can simultaneously access a plurality of different web pages via network interface 112. In FIG. 6 and FIG. 7, active-page indicator 286 shows the numeral "1", indicating an identifier of the web page is currently being accessed. Address field 290 contains the Uniform Resource Locator (URL) that corresponds to the contents shown in browser pane 258 as well as favicon 266 and page title 270.

Browser pane 258 shows the web page contents corresponding to the web page that is hosted at the URL within address field 290.

Tool bar 262 comprises a plurality of icons representing different tools which can be selected via pointing device 164. In a present non-limiting example, tool bar 262 comprises a URL soft-button 294 which can be activated to send a signal to processor 100 so as to cause processor 100 to receive input of another URL for another web page to be generated on display 158 in browser pane 258. Tool bar 262 also comprises a bookmark soft-button 298 which can be activated to send a signal to processor 100 so as to cause processor 100 to add the current page shown in browser pane 258 as a bookmark or for other bookmark operations. Tool bar 262 also comprises a select soft-button 302 which can be activated to send a signal to processor 100 so as to cause processor 100 to receive input of a portion of browser pane 258 to select portions of text or images within browser pane 258. Tool bar 262 also comprises a zoom-in soft-button 306 and a zoom-out soft-button 310, either of which can be activated to send a signal to processor 100 so as to cause processor 100 to either zoom-in to, or zoom-out from, a particular region or other area of interest within browser pane 258.

At this point it is to be reiterated that the various elements shown in FIG. 6 and FIG. 7 are exemplary features of browser application 124 and that variations thereon are contemplated.

The views in FIG. 6 and FIG. 7 provide a non-limiting example of performance of block 520, where the selected networking application is browser application 124 and the contents in browser pane 258 are provided from a server 58 addressable via the URL in address field 290. Further, also of note is that the contents in browser pane 258 comprise a link 314 to a video that can be played on device 54 through a video player application embedded within browser 124. Alternatively device 54 can be configured so that the video is playable in a separate video player application that is one of the additional applications 128 that can be invoked via link 314 from browser 124.

Figure 8:
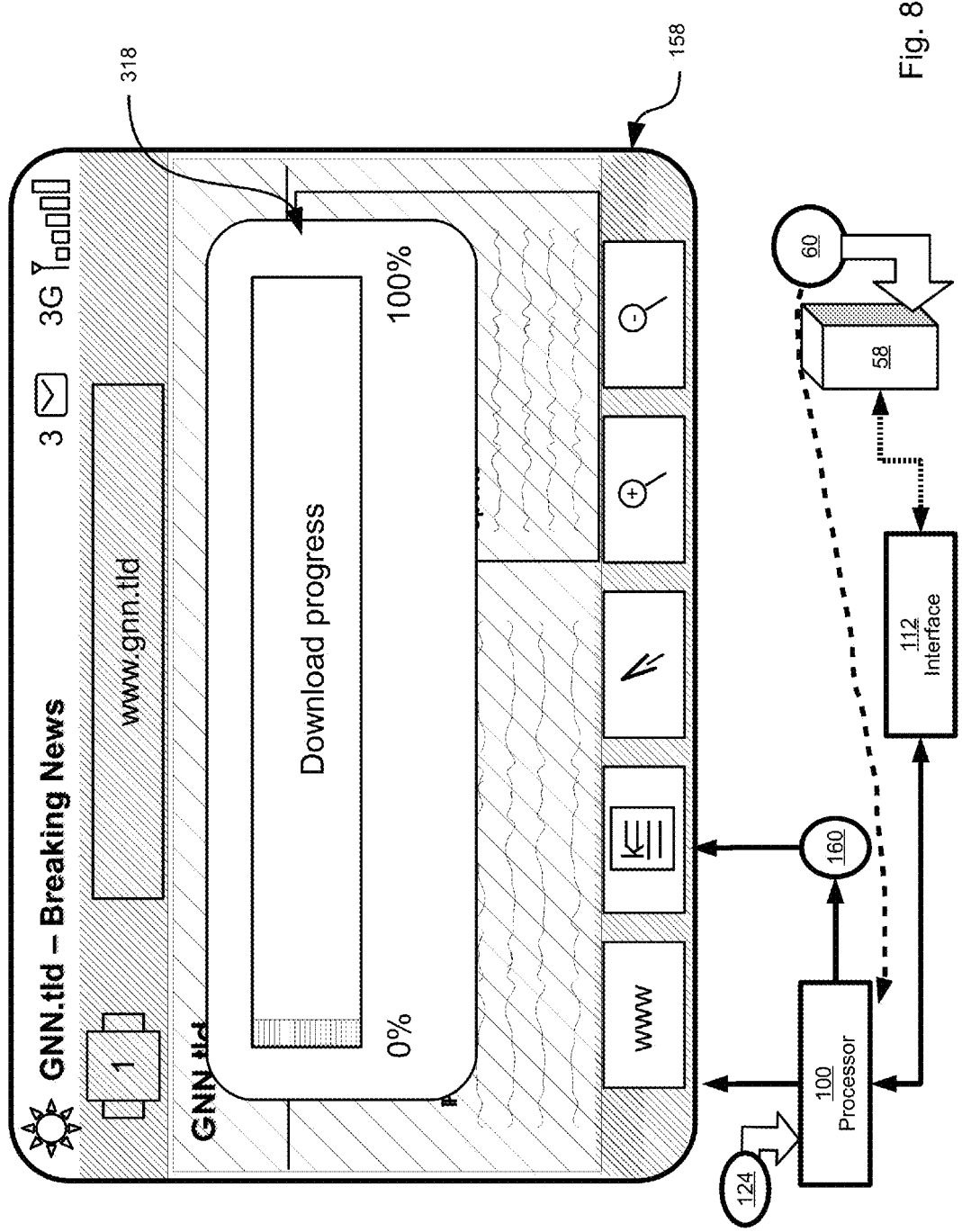
FIG. 8 shows another representation of the device of FIG. 6.

The selection of link 314 comprises one way in which method 500 can be advanced from block 520 to block 525. Block 525 thus comprises accessing a network server. In general terms, block 525 contemplates the connection of the device 54 to a remote computer such as one of the servers 58. In the example in relation to FIG. 7, the selection of link 314 results in an instruction to processor 100 requesting the download of the file associated with link 314 to device 54. Assuming link 314 is selected, then the view in FIG. 8 can be generated which shows a download progress bar 318 as having advanced slightly past zero percent reflecting the download of content 60 from server 58.

Block 530 comprises determining if a network download is in progress. In general terms block 530 comprises a determination if a data transfer is occurring between device 54 and one of the servers 58. If a "no" determination is made then method 500 advances to block 535, which will be discussed further below. Given the hypothetical example in FIG. 8, a "yes" determination is made at block 530 thereby advancing to block 540.

Figure 10:
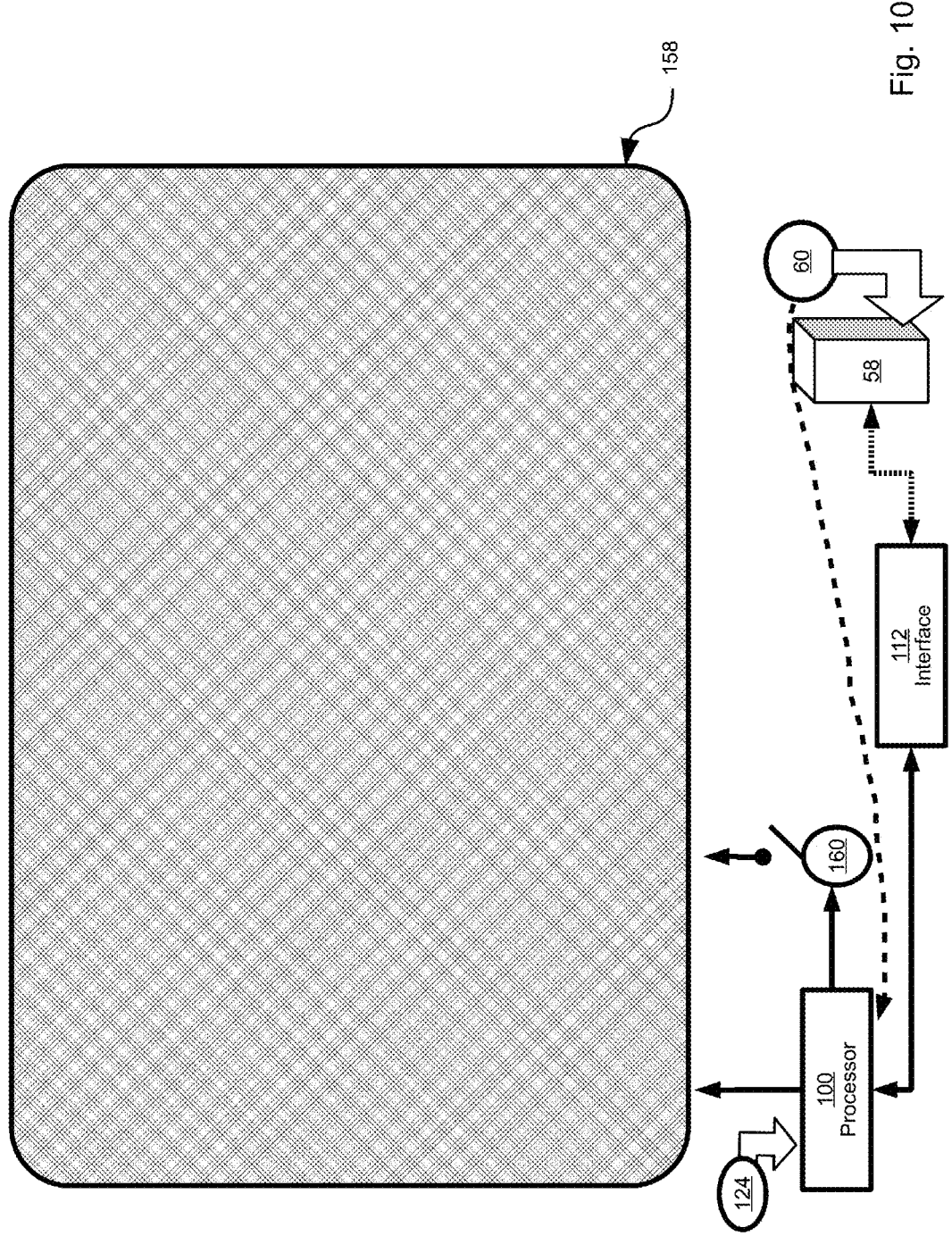
FIG. 10 shows another representation of the device of FIG. 6 where the display has been deactivated.

Block 540 comprises deactivating the backlight in order to reduce power consumption. Exemplary performance of block 540 is shown in FIG. 9 and FIG. 10. In FIG. 9, an advisory message is shown indicating that the display will be turned off until the download is complete. Optionally, during display of the view in FIG. 9, display 158 can be partially powered, in a dimmed state, for a short time duration rather than being fully powered into a fully bright state. In FIG. 10, the circuit between backlight 160 and display 158 is shown in an open position, such that display 158 is black due to the fact that backlight 160 is unpowered.

Figure 13:
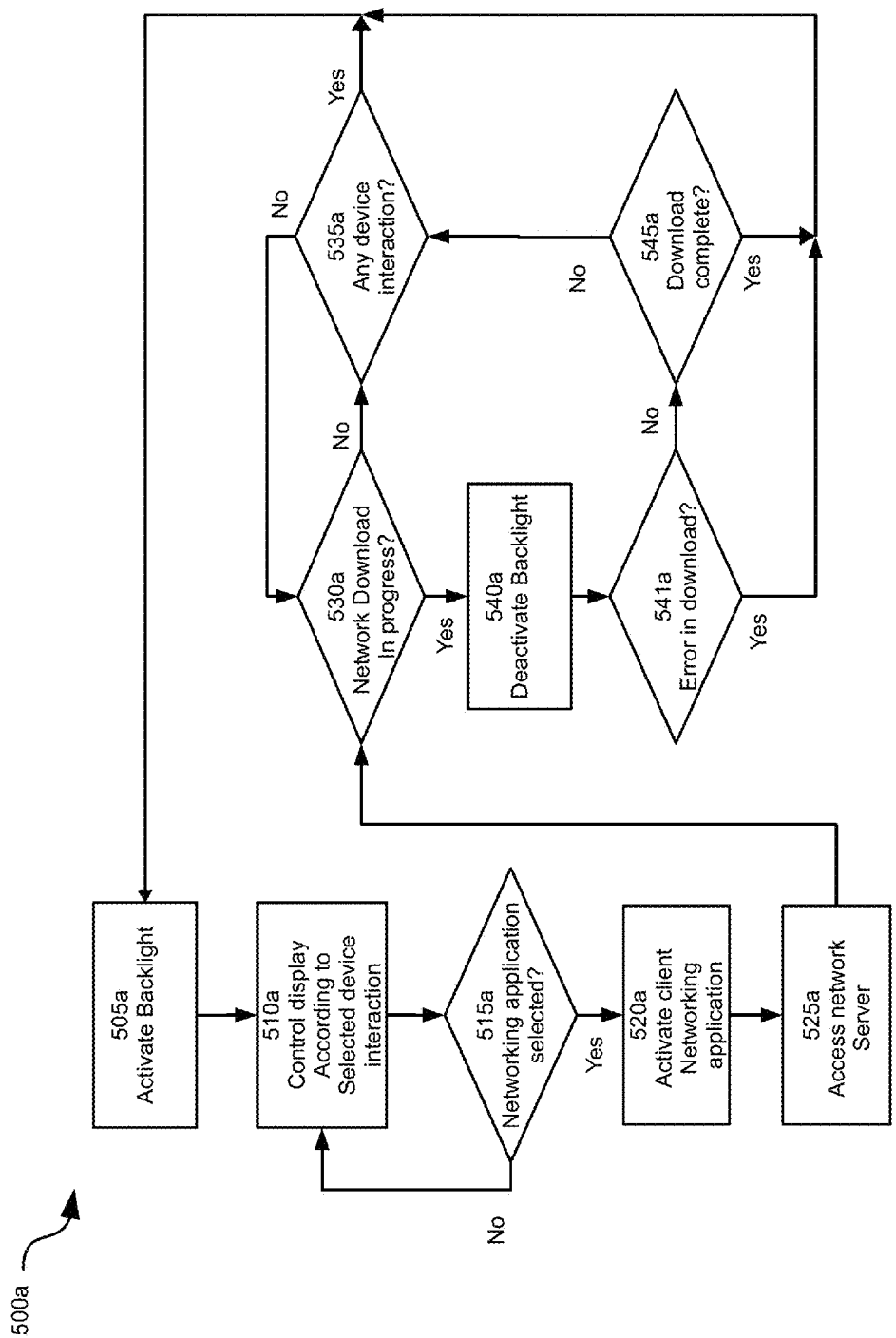
FIG. 13 shows a variation on the flow chart of FIG. 5.

Block 545 comprises determining if the download contemplated at block 530 is complete, or at least a certain portion of the download is complete. A "no" determination leads to block 535, whereas a "yes" determination leads to block 505, whereupon the backlight is reactivated. A "no" determination when content 60 has not completed a full transfer from server 58 to device 54, such that progress bar 318 would (if it were visible) indicates less than one-hundred percent. In contrast, a "yes" determination would be reached when content 60 has completed a fully transfer from server 58 to device 54, such that progress bar 318 would (if it were visible) indicate one-hundred percent. (Alternatively, a yes determination could also be reached in the event that a non-recoverable failure of the download had occurred such that the download cannot complete. Such a failure could occur due to any number of circumstances, such as a communication error over link 74, or an overload of server 58. This alternative is shown in FIG. 13 as method 500*a*, which is the same as method 500 except that block 541*a* is also provided whereby a determination is made as to whether an error has occurred during the download.)

Block 535 comprises determining if any device interaction has occurred. A "yes" determination leads to block 505 at which point backlight 505 is reactivated so that the contents of display 158 becomes visible again, while a "no" determination leads back to block 530. What constitutes device interaction, and thereby results in a "yes" determination is not particularly limited, but in the context of device 54, device interaction may include the receipt of any input from keyboard 162 or pointing device 164 or any other selected input apparatus on that is present on device 54. Device interaction can also include, however, an event or notification generated by an application executing on device 54 for which activation of display 154 is important. Where conditions do not result in a "yes" determination then a "no" determination is reached.

When conditions result in a loop from block 530 to block 540 to block 545, to block 535 and back to block 530 occurs, then display 158 maintains the appearance shown in FIG. 10. Conditions resulting in this kind of loop occur when the download is in progress but no device interaction is occurring.

Figure 11:
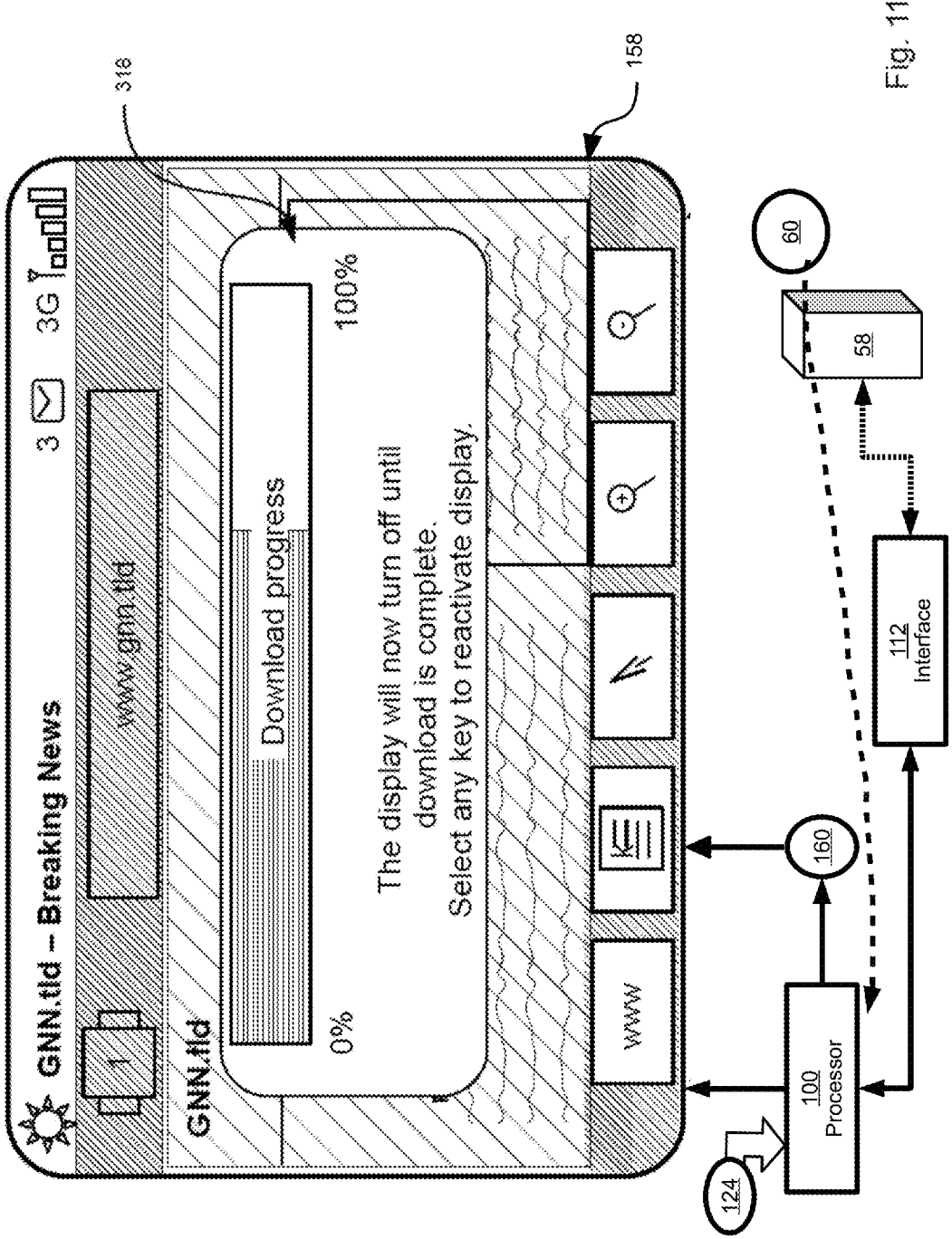
FIG. 11 shows another representation of the device of FIG. 6 where the display has been reactivated when the file transfer is partially complete.

When a download is not complete while at block 545, method 500 will advance from block 545 to block 535. However if a device interaction has occurred that results in a "yes" determination at block 535, then method 500 will advance to block 505. An example of these conditions is shown in FIG. 11, whereby the depression of a single key on keyboard 162 has been received resulting in a "yes" determination at block 535 and leading to block 505 thereby causing reactivation of backlight 160. During such reactivation, the current level of download progress is shown, as well as a message indicating that the display will turn off again until the download is complete. If no other device interactions occur, then method 500 will cycle eventually back to block 540 so that backlight 160 is again deactivated leading device 54 back to the state shown in FIG. 10.

Figure 12:
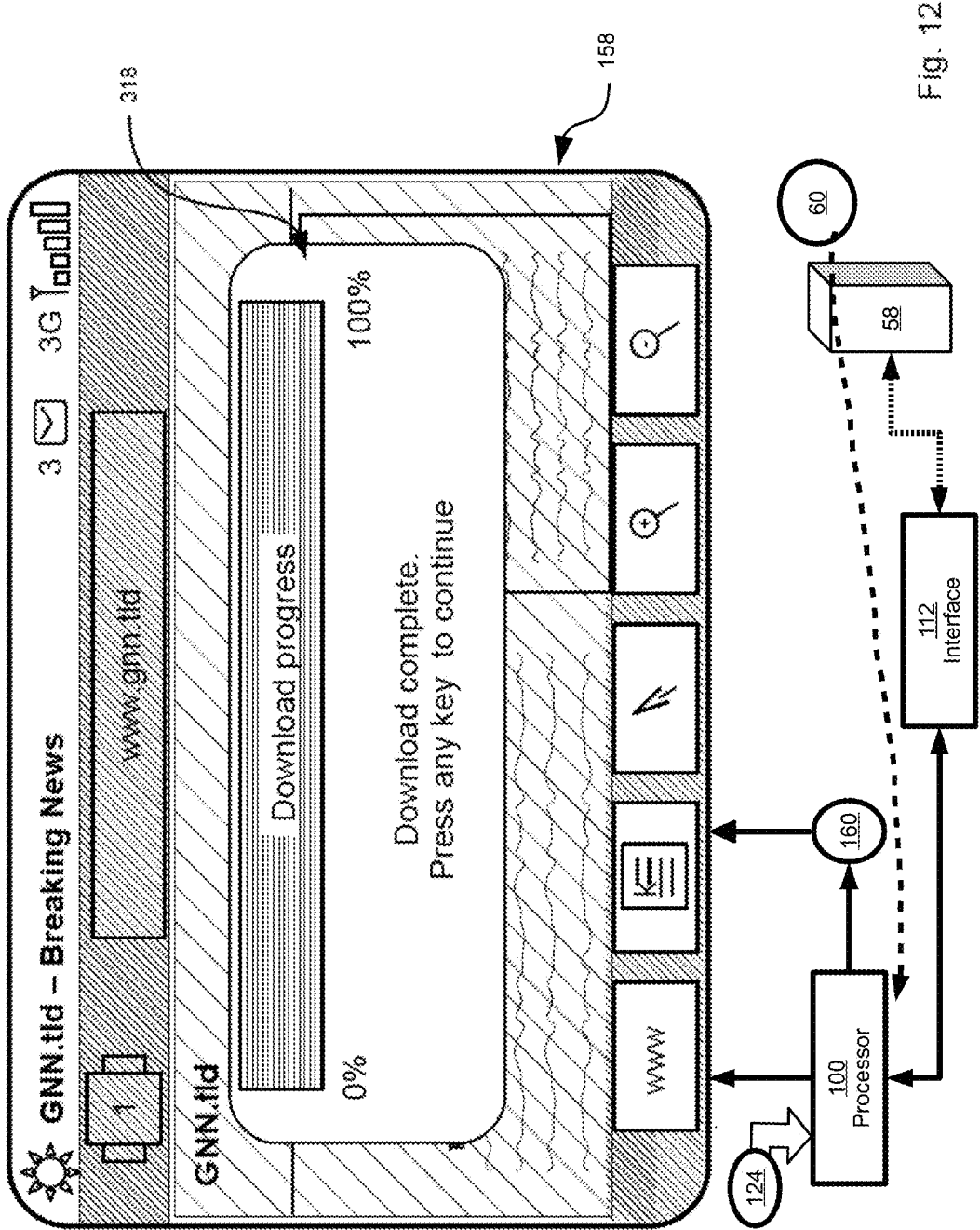
FIG. 12 shows another representation of the device of FIG. 6 where the display has been reactivated when the download is complete.

When a download is determined to complete at block 545, method 500 advances from block 545 to block 505, at which point the backlight is reactivated. FIG. 12 shows an example of device 54 in this state, whereby backlight 160 has been reactivated and thus display 158 is lit. Progress bar 318 indicates that the download is complete and prompts for further input.

Variations, subsets, enhancements and combinations of the foregoing are contemplated. For example, while backlight 160 and display 158 are contemplated, it will be understood that in other types of display technologies, a backlight may be obviated such that it is the display itself that is turned off at block 545 and turned on at block 505. Furthermore, it will be understood that the types of device interaction that can lead to a "yes" determination at block 535 are not particularly limited, and can include the possibility that processor 100 is configured to execute multiple applications, so that blacklight 160 may be reactivated so that the graphic interfaces of another application may be generated on display 154 (with backlight 160 therefore active) while the download is occurring. As another non-limiting example, while backlight 160 is off, device 54 can be configured so that an incoming telephone call is sufficient to result in a "yes" determination at block 535. Other examples of events that can result in a "yes" determination at block 535 comprise, without limitation, when an automatic refresh of web page occurs, when any type of data other than the download data is pushed to device 54, an alarm, calendar notification, when a data input request from another application is generated on display 158, or when a secure web page (e.g. a bank web site) generates a warning of automatic connection termination due to inactivity.

As another variation, method 500 can be modified so that when a download is complete, rather than reactivating backlight 160, another type of output can be generated. For example, where device 54 is equipped with a light emitting diode (LED) or other light-emitting indicator, then method 500 can be modified so that when the download is complete, the LED indicator flashes, but the backlight 160 itself remains off until input is detected via keyboard 162 or pointing device 164 or other input apparatus. This variation can be extended beyond LED indicators, to include haptic output, or an audible alarm generated via speaker 166.

As another variation, device 54 can be configured so that the transition between the view in FIG. 9 and FIG. 10 is accomplished via a fading-out effect or dimming. Indeed, it should be understood that in general the term "deactivate" should be construed in a non-limiting sense and can include various methodologies whereby the result is that display 158 or backlight 160 or both of them draw a reduced amount of power from power supply 114 than when display 158 or backlight 160 or both of them are active. Likewise, the term "activate" can also be accomplished through various methodologies to bring display 158 or backlight 160 into an active state whereby additional power is drawn from power supply 114 in order that display 158 is controlled to emit images therefrom.

As a still further variation, content 60 itself can be configured to include a flag to signal to device 54 to reactivate backlight 160. Such a flag may be included at the very end of the content 60 so that the backlight is activated when the download of content 60 is complete, or somewhat before the download is complete so there is a warning or indication that the download is nearly complete. Likewise, method 500 can be modified so that block 545 results in a "yes" determination when the download is nearly complete. The term "nearly complete" contemplates that at a predetermined point in the download prior to a complete download, a "yes" determination would be reached. Such a predetermined point could be, for example, when the download is ninety-five percent complete, or when an estimated remaining amount of time is below a certain threshold.

It should also be understood that method 500 can be applied to the download (or, in a more generic sense, a data transfer) of any type of content, including web pages, data files, videos, music, scripts, maps, or applications. In the case of applications for which a download and installation has been instructed, then device 50 can be configured to only reactivate the backlight after both the download and the installation has been effected.

Method 500 can also be integrated into traditional screen-saver or backlight timers programs which are currently deployed to deactivate a backlight or display itself (or to activate a screen-saver graphic) when a predetermined time period of inactivity has elapsed. In this variation, the timer countdown can be advanced to the threshold time for deactivating the display immediately upon, or within a predetermined time period after, a download has been commenced. By the same token, the traditional screen-saver or backlight timer programs can be modified to reset the countdown timer immediately upon completion of the download so that the backlight or display is automatically reactivated but the countdown timer recommences so that the backlight or display will be deactivated when a further download commences or when a period of inactivity has elapsed.

As another variation, method 500 can be modified for file uploads in addition to file downloads, or bi-directional transfers. In general method 500 is applicable to any type of data transfer between device 54 and a remote computer, whether through a network or even via a peer-to-peer connection, such as through a Bluetooth™ connection.

As another variation, method 500 can be modified for file transfers within different storage devices in, or directly connected to, device 54. For example, method 500 can be applied to a transfer between non-volatile storage 104 and a removable storage device (not shown) that connects to device 54.

In general terms, it will now be understood that method 500 can be applied to any type of remote computing apparatus that is connectable to device 54, including a server, a peer-to-peer connected computing device, or even a removable storage device associated with device 54.

In addition to file transfers, various other types of device processing can be applied to variations of method 500. For example, if device is in any state where regular processing is occurring and does not require user interaction. For example, when installing an application or moving files between internal memory and removable storage device. As another example, where device 54 is equipped with an audio player, then when device 54 is playing the audio file, the display (or backlight) could be deactivated or dimmed, and then reactivated upon termination of the play back. As another example, where device 50 is booting up, loading a large file from non-volatile storage into processor 100, or when applying a graphical theme. In general, method 500 can be applied to any process that takes some time for completion during which input is optional and usually intended to switch tasks or to escape the current action. A non-limiting example of this variation is shown in FIG. 14 as method 500b. Method 500b is a variation of method 500 and thus like blocks bear like references except followed by the suffix "b". Of note is that block 515*b* comprises determining that a processing operation is occurring which does not require user interaction, such as generation of output or reception of input. On a yes determination at block 515*b*, method 500*b* advances to block 540*b* and the backlight is deactivated. Block 545*b* is a variation on block 545, and comprises determining if at least a portion of the operation contemplated at block 515*b* is complete. Block 535*b* is substantially the same as block 535, and contemplates a determination whereby, notwithstanding the fact that the processing operation contemplated at block 515*b* does not require interaction, nonetheless some sort of device interaction is occurring. Thus, those skilled in the art will now recognize that the processing operation contemplated at block 515*b* can comprise, as indicated above, and by way of non-limiting examples, a download, a file transfer, an application installation, playing an audio file, device boot-up, installation of a device theme.

As another variation, the advisory message in FIG. 9 can be made more express, such as by stating: "The display will be powered down to reduce power consumption and conserve battery and will be restored upon completion of the requested operation, please wait or press any key to abort".

As noted earlier, all of the foregoing can be incorporated into, or associated with a traditional screen-saver or backlight timer application.

Other variations, combinations, and subsets will now occur to those skilled in the art. Furthermore, various advantages will now be apparent, including the fact that a reduced level of power is drawn from power supply 114 when backlight 160 is off, and thereby increasing the amount of time needed between charges to power supply 114.

The invention claimed is:

1. A method for power management in a mobile computing device comprising:
   activating a display in said mobile computing device such that a first amount of power is drawn from a power supply of said mobile computing device;
   maintaining a timer for measuring periods of inactivity at said mobile computing device; said timer configured to deactivate said display when said timer reaches a predefined threshold;
   initiating a data transfer operation to retrieve content for presentation on said display;
   in response to said initiating, advancing said timer to said predefined threshold by setting said timer to a value greater than a current period of inactivity, to deactivate said display such that a second amount of power is drawn from said power supply, said second amount being less than said first amount;
   during retrieval of said content, detecting a flag in said content indicating that a predefined portion of said content has been downloaded, said flag at a location in said content that indicates the predefined portion being downloaded, the flag comprising a warning that download of said content is complete or nearly complete;
   in response to said detecting, automatically reactivating said display; and
   automatically activating at least one of a light emitting diode indicator, a speaker, or a haptic output device in response to said detecting;
   wherein: said data transfer operation is for retrieving said content from a remote computing apparatus connected to said mobile computing device; said remote computing apparatus is at least one of a server connected to said computing device via a network and said data transfer operation is a download from said server; another computing device connected via a peer-to-peer connection to said computing device; a storage device locally connectable to said computing device; said display comprises a backlight and said activating comprising activating said backlight and said deactivating comprises deactivating said backlight; and said data transfer operation comprises at least one of a file transfer, an application installation, playing an audio file, implementing a device boot-up sequence, and installation of a device theme.

2. The method of claim 1 wherein said deactivating comprises one of dimming said display and turning off said display such that said second amount is zero.

3. The method of claim 1, further comprising reactivating said display during said data transfer operation upon detecting a device interaction other than the detection of said flag.

4. The method of claim 3 further comprising deactivating said display if said device interaction ceases and said flag has not been detected.

5. The method of claim 3 wherein said device interaction comprises one of receipt of input via an input apparatus connected to said mobile computing device; when an automatic refresh of web page occurs; when any additional content other than said content is received by said device; an alarm; a calendar notification; when a secure web page generates a warning of automatic connection termination due to inactivity.

6. The method of claim 1 further comprising reactivating said display if said data transfer operation fails before said flag has been detected.

7. A mobile computing device comprising:
   a power supply;
   a display connected to said power supply;
   a processor connected to said power supply and said display; said processor configured to:
     activate said display such that a first amount of power is drawn from said power supply of said mobile computing device;
     maintain a timer for measuring periods of inactivity at said mobile computing device; said timer for deactivating said display when said timer reaches a predefined threshold;
     initiate a data transfer operation to retrieve data for presentation on said display;
     in response to said initiating, advance said timer to said predefined threshold by setting said timer to a value greater than a current period of inactivity, to deactivate said display such that a second amount of power is drawn from said power supply, said second amount being less than said first amount;
     during retrieval of said content, detect a flag in said content indicating that a predefined portion of said content has been downloaded, said flag at a location in said content that indicates the predefined portion being downloaded, the flag comprising a warning that download of said content is complete or nearly complete;
   in response to said detecting, automatically reactivate said display; and
   automatically activate at least one of a light emitting diode indicator, a speaker, or a haptic output device in response to said detecting;
     wherein: said data transfer operation is for retrieving said content from a remote computing apparatus connected to said mobile computing device; said remote computing apparatus is at least one of a server connected to said computing device via a network and said data transfer operation is a download from said server; another computing device connected via a peer-to-peer connection to said computing device; a storage device locally connectable to said computing device; said display comprises a backlight and said activating comprising activating said backlight and said deactivating comprises deactivating said backlight; and said data transfer operation comprises at least one of a file transfer, an application installation, playing an audio file, implementing a device boot-up sequence, and installation of a device theme.

8. The mobile computing device claim 7 wherein said deactivating comprises dimming said display or turning off said display such that said second amount is zero.

9. The mobile computing device claim 7 wherein said processor is further configured to reactivate said display during said data transfer operation upon detecting a device interaction other than the detection of said flag.

10. The mobile computing device of claim 9 wherein said processor is further configured to deactivate said display if said device interaction ceases and said flag has not been detected.

11. The mobile computing device of claim 9 wherein said device interaction comprises one of receipt of input via an input apparatus connected to said mobile computing device; when an automatic refresh of web page occurs; when any additional content other than said content is received by said device; an alarm; a calendar notification; when a secure web page generates a warning of automatic connection termination due to inactivity.

12. The mobile computing device of claim 7 wherein said processor is further configured to reactivate said display if said data transfer operation fails before said flag has been detected.

13. A non-transitory computer readable medium storing a computer program, wherein execution of the computer program is for:
   activating a display in said mobile computing device such that a first amount of power is drawn from a power supply of said mobile computing device;
   maintaining a timer for measuring periods of inactivity at said mobile computing device; said timer configured to deactivate said display when said timer reaches a predefined threshold;
   initiating a data transfer operation to retrieve data for presentation on said display;
   in response to said initiating, advancing said timer to said predefined threshold by setting said timer to a value greater than a current period of inactivity, to deactivate said display such that a second amount of power is drawn from said power supply; said second amount being less than said first amount;
   during retrieval of said content, detecting a flag in said content indicating that a predefined portion of said content has been downloaded, said flag at a location in said content that indicates the predefined portion being downloaded, the flag comprising a warning that download of said content is complete or nearly complete;
   in response to said detecting, automatically reactivating said display; and
   automatically activating at least one of a light emitting diode indicator, a speaker, or a haptic output device in response to said detecting;
   wherein: said data transfer operation is for retrieving said content from a remote computing apparatus connected to said mobile computing device; said remote computing apparatus is at least one of a server connected to said computing device via a network and said data transfer operation is a download from said server; another computing device connected via a peer-to-peer connection to said computing device; a storage device locally connectable to said computing device; said display comprises a backlight and said activating comprising activating said backlight and said deactivating comprises deactivating said backlight; and said data transfer operation comprises at least one of a file transfer, an application installation, playing an audio file, implementing a device boot-up sequence, and installation of a device theme.

* * * * *